US012683440B2

(12) United States Patent
Popescu et al.

(10) Patent No.: US 12,683,440 B2
(45) Date of Patent: Jul. 14, 2026

(54) STATOR ASSEMBLY

(71) Applicant: Hamilton Sundstrand Corporation, Charlotte, NC (US)

(72) Inventors: Andrei Popescu, Coventry (GB); Paul Charles Harris, Leighton (GB); Aaron Christopher Day, Sevenoaks (GB); Thilak Raj Durairaj, Solihull (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 226 days.

(21) Appl. No.: 18/662,846

(22) Filed: May 13, 2024

(65) Prior Publication Data

US 2024/0388143 A1 Nov. 21, 2024

(30) Foreign Application Priority Data

May 19, 2023 (EP) ..................................... 23174386

(51) Int. Cl.
*H02K 1/16* (2006.01)
*H02K 15/021* (2025.01)

(52) U.S. Cl.
CPC ........... *H02K 1/165* (2013.01); *H02K 15/021* (2025.01)

(58) Field of Classification Search
CPC ...... H02K 1/165; H02K 15/021; H02K 1/187; H02K 15/022; H02K 1/148
See application file for complete search history.

(56) References Cited

U.S. PATENT DOCUMENTS

| | | | |
|---|---|---|---|
| 6,389,679 B1 | 5/2002 | Kliman et al. | |
| 7,352,099 B2 | 4/2008 | Schunk et al. | |
| 8,274,192 B2 * | 9/2012 | Lokhandwalla | ....... H02K 1/148 |
| | | | 310/433 |
| 9,722,465 B2 | 8/2017 | Hazeyama et al. | |
| 9,800,123 B2 | 10/2017 | Zhang et al. | |
| 10,819,169 B2 | 10/2020 | Ogawa et al. | |
| 10,833,541 B2 | 11/2020 | Saban et al. | |
| 10,892,661 B2 | 1/2021 | Woo et al. | |
| 11,245,293 B2 | 2/2022 | Hsu et al. | |
| 11,489,379 B2 | 11/2022 | Kislev et al. | |
| 2010/0019626 A1 * | 1/2010 | Stout | ........................ H02K 3/50 |
| | | | 310/214 |

(Continued)

FOREIGN PATENT DOCUMENTS

| | | | | |
|---|---|---|---|---|
| CN | 103138422 A | 6/2013 | | |
| CN | 105515230 A | * 4/2016 | ............... | H02K 3/18 |

(Continued)

OTHER PUBLICATIONS

CN-105515230-A_translate (Year: 2016).*

(Continued)

*Primary Examiner* — Tulsidas C Patel
*Assistant Examiner* — Mohammed Ahmed Qureshi

(57) ABSTRACT
A stator assembly for an electrical machine, including stator teeth which are individually formed and are spaced azimuthally from each other. Each stator tooth includes an azimuthally extending central flange arranged to engage with the central flange of an adjacent stator tooth. The stator assembly includes clamping elements which are arranged between the stator teeth and are arranged to exert a radially inward force on each stator tooth, to hold the stator assembly together.

20 Claims, 12 Drawing Sheets

(56) References Cited

U.S. PATENT DOCUMENTS

| | | | |
|---|---|---|---|
| 2013/0113334 A1* | 5/2013 | Allen ..................... | H02K 1/185 |
| | | | 310/216.134 |
| 2021/0091610 A1 | 3/2021 | Walter | |
| 2022/0209605 A1 | 6/2022 | Page et al. | |
| 2022/0337104 A1 | 10/2022 | Sturm et al. | |
| 2023/0038547 A1 | 2/2023 | Hafner | |

FOREIGN PATENT DOCUMENTS

| | | | |
|---|---|---|---|
| JP | 5805330 | B2 | 11/2015 |
| WO | 2021051702 | A1 | 3/2021 |

OTHER PUBLICATIONS

Office Action dated Apr. 9, 2025 in connection with European Patent Application No. 23 174 386.5, 9 pages.
Extended European Search Report in connection with counterpart European Patent Application No. 23174386.5 dated Nov. 2, 2023, 24 pages.

* cited by examiner

STATOR ASSEMBLY

CROSS-REFERENCE TO RELATED APPLICATION AND PRIORITY CLAIM

This application claims priority under 35 U.S.C. § 119 to European Patent Application No. 23174386.5 filed on May 19, 2023, which is hereby incorporated by reference in its entirety.

FIELD OF TECHNOLOGY

The examples described herein relate to a stator assembly for an electrical machine, in particular a stator assembly that is formed from individually manufactured stator teeth.

BACKGROUND OF THE INVENTION

Electric generators or motors comprise a stator and a rotor. A stator may comprise multiple stator teeth on which stator windings are mounted. The stator teeth may be manufactured individually and joined together in the assembly process to prevent wastage of the materials used to form each stator tooth. However, it is difficult to align the individual stator teeth, in order to allow for adequate transfer of electromagnetic flux and heat, without expensive machining of the stator teeth.

There is therefore a need for an improved stator assembly in which the stator teeth are formed to allow the stator assembly to be easily aligned and secure once formed, while also being cost-effective.

SUMMARY OF THE INVENTION

According to this disclosure, there is provided a stator assembly for an electrical machine, wherein the stator assembly extends azimuthally around an axis, wherein the stator assembly comprises: a plurality of stator teeth extending radially; wherein the plurality of stator teeth are spaced azimuthally; and wherein the plurality of stator teeth extend along a direction parallel to the axis of the stator assembly; wherein each stator tooth is individually formed and comprises a radially extended body portion; wherein the radially extended body portion comprises: an upper body portion; a lower body portion; and a central flange located along the length of the body portion between the upper body portion and the lower body portion; wherein the central flange is arranged to engage with the central flange of an adjacent stator tooth; wherein the stator assembly further comprises: a plurality of clamping mechanisms; wherein each clamping mechanism is arranged between an adjacent pair of stator teeth; wherein each clamping mechanism extends axially between the lower body portions of the adjacent pair of stator teeth; wherein each clamping mechanism is arranged to engage with the radially innermost end of the body portions of the adjacent pair of stator teeth; and wherein each clamping mechanism is arranged to exert a radially inward force on the adjacent pair of stator teeth, such that the stator teeth are held together.

Also according to this disclosure, there is provided a method of assembling a stator assembly for an electrical machine, wherein the stator assembly extends azimuthally around an axis, the method comprising: individually forming a plurality of separate stator teeth; wherein each stator tooth comprises: a radially extended body portion; wherein each radially extended body portion comprises: an upper body portion; a lower body portion; and a central flange located along the length of the body portion between the upper body portion and lower body portion; wherein the method further comprises: assembling the stator teeth such that they are spaced azimuthally, extend radially, and extend along a direction parallel to the axis of the stator assembly; engaging the central flange of each stator tooth with the central flange of the adjacent stator tooth; arranging a plurality of clamping mechanisms such that there is a clamping mechanism between each adjacent pair of stator teeth; wherein each clamping mechanism extends axially between the lower body portions of the respective adjacent pair of stator teeth; and engaging the clamping mechanism with the radially innermost end of the body portions of the adjacent pair of stator teeth; wherein each clamping mechanism exerts a radially inward force on the respective adjacent pair of stator teeth, holding the stator teeth together.

It will be appreciated that all of the features described herein relating to the stator assembly apply equally to the method of manufacturing and assembling the stator, and vice versa.

The stator assembly, of an electrical machine, which extends azimuthally (e.g. fully circumferentially) around a longitudinal axis, has a plurality of stator teeth, on which windings of an electromagnetic coil can be mounted. The stator assembly may be substantially rotationally symmetric about its longitudinal axis. In one example, the stator assembly is generally cylindrical, e.g. with the cylindrical axis equating to the longitudinal axis.

In some examples, the stator assembly may be arranged to be used with an inner rotor and therefore may comprise an outer stator. In other examples, the stator assembly may be arranged to be used with an outer rotor and therefore may comprise an inner stator.

The plurality of stator teeth are formed individually, so they are not integral with or connected to one another. In some examples, each stator tooth is entirely separate and mechanically isolated from each of the other stator teeth when manufactured. Once formed, the plurality of stator teeth are arranged such that they are spaced (e.g. evenly) azimuthally (from each other) to form the stator assembly, i.e. stator tooth is at a different azimuthal position to each of the other stator tooth.

In some examples, the stator teeth are stamped from the same sheet of metal, where each stator tooth is spaced physically apart from all other stator teeth. This may allow all stator teeth to be formed at the same time whilst still being formed individually.

In some examples the plurality of stator teeth project radially inwards (e.g. from a stator housing arranged radially outwards of the stator teeth). This may be suitable for an outer stator arrangement (e.g. to be used with an inner rotor). In some examples the plurality of stator teeth project radially outwards (e.g. from a stator housing arranged radially inwards of the stator teeth). This may be suitable for an inner stator arrangement (e.g. to be used with an outer rotor).

In some examples the stator housing comprises an electronics housing for the electronics of the motor. In some examples the stator housing comprises a cover extending circumferentially around the outer circumference of the plurality of stator teeth. This may protect the stator teeth and associated electronics from damage (e.g. corrosion and/or foreign object damage).

Each individual stator tooth is stamped separately, then assembled to form the stator assembly. This reduces the material loss of sheet metal in comparison to cutting out a large torus of a plurality of already joined stator teeth where the centre-cut of sheet metal would be wasted. This may be advantageous due to the material typically being used for stator teeth being a high cost metal (e.g. cobalt and iron alloys), and hence may reduce the overall costs of manufacturing the stator assembly.

This is especially applicable for large diameter stators, which may generate significantly less waste when the stator teeth are stamped individually. Furthermore, as many individual teeth may be stamped simultaneously, there may not be a significant difference in the time taken to manufacture the stator teeth.

In some examples, each stator tooth may be arranged for mounting a winding of an electromagnetic coil (or portion thereof). In an example, the stator windings may be wound around the (e.g. each) stator tooth prior to the assembly of the main stator core. Arranging the stator windings before assembling the main stator core may allow the windings to be wound more tightly around individual teeth. In some examples, tighter windings may cause larger air gaps to be present between adjacent stator teeth upon assembly. The presence of air gaps may prevent overheating of the motor, and therefore larger air gaps may cool the stator assembly more efficiently.

In an example, the winding process may be carried out automatically. This may make the manufacturing and assembly process both cheaper and faster.

It is advantageous to construct the stator assembly from individual stator teeth. If part of the stator assembly is damaged (e.g. during assembly or use), instead of the entire stator core being replaced, only the one or more individual broken stator teeth may be removed and replaced. This may simplify and lower the cost of repair of individual stator windings caused by foreign object damage in the air-cooling process and may increase the lifetime of the motor.

The (e.g. each) stator tooth extends in an axial direction (parallel to the axis of the stator assembly). In some examples the stator tooth or each of the plurality of stator teeth has a substantially constant cross section (in a plane perpendicular to the axis of the stator assembly).

The (e.g. each) stator tooth extends radially, with an end radially proximal to the centre of the stator assembly, and another end radially distal to the centre of the stator assembly. The (e.g. each) stator tooth comprises an upper body portion extending radially towards the distal end of the stator tooth, and a lower body portion extending radially towards the proximal end of the stator tooth.

In some examples, the upper body portion of the (e.g. each) stator tooth may be arranged for mounting a winding of an electromagnetic coil (or portion thereof).

In some examples, the (e.g. each) stator tooth further comprises an upper flange at the end distal from the centre of the stator assembly (e.g. distal from the central flange), wherein the flange projects azimuthally from the stator tooth. The upper flange may be arranged to prevent movement of the stator windings radially outwards during assembly and use of the stator, as without the upper flange the windings may be able to slide off the distal end of the stator tooth.

Furthermore, the central flange may help to prevent movement of the windings radially inwards during assembly and use of the stator. By holding the windings in a stable position, the windings may be resistant to mechanical vibrations which may occur over the lifetime of the stator, which may improve its performance and increase its lifetime.

The central flange extends azimuthally from the stator tooth, and is arranged to engage with an identical, adjacent tooth. Therefore, when the plurality of stator teeth are arranged such that they are spaced azimuthally to form the stator assembly, each central flange of the stator teeth engages with the adjacent central flange.

In some examples, the central flanges are at different radial positions on either side of the stator tooth, so that radial facing surfaces of the central flanges engage with each other. The engagement between the central flanges provides friction between pairs of adjacent stator teeth, which may help to hold the stator assembly together by preventing movement of the stator teeth.

Furthermore, in addition to helping hold the stator assembly together, the central flange allows for pairs of adjacent stator teeth to be substantially in contact with each other. This allows for the transfer of the electromagnetic flux needed for the stator assembly to function, despite the stator teeth being manufactured separately.

The clamping mechanism is arranged to exert a radially inward force on the respective adjacent pair of stator teeth, such that when a plurality of clamping mechanisms exert a radially inward force in the stator assembly it may prevent radial and axial movement of the individual stator teeth relative to each other. Using a clamping mechanism between each pair of adjacent stator teeth may allow for more reliable construction of the stator assembly using individually formed stator teeth, as the stator assembly may not solely be held together using friction between the adjacent stator teeth.

In some examples, the radially innermost (proximal) end of (e.g. the lower body portion of) the (e.g. each) stator tooth comprises a lower flange, e.g. extending azimuthally, e.g. from both sides of (e.g. the lower body portion of) the (e.g. each) stator tooth. In an example, the lower flange(s), e.g. of each adjacent pair of stator teeth, is arranged to engage with the respective clamping mechanism. In this example, the clamping mechanism exerts a radially inward force on the lower flanges of the adjacent pair of stator teeth, which may help to draw the stator teeth radially inward and hold them in the desired position.

In some examples, the stator teeth are arranged to surround a stator body, e.g. a heat sink. In an example, the stator teeth are attached to the stator body, e.g. by clamping or gluing. This may allow for rapid alignment of the stator teeth, which may help improve the efficiency of assembly.

In some examples, the (e.g. each) clamping mechanism comprises a clamping element arranged to extend longitudinally along the axis of the stator assembly. In some examples, the (e.g. each) clamping element has the same axial extent as the respective stator tooth.

In an example, the (e.g. each) clamping element is arranged to exert a force azimuthally on the inside faces of the lower body portions of the respective adjacent pair of stator teeth, and a force radially inwards on the lower flanges of the respective adjacent pair of stator teeth.

In some examples, the (e.g. each) clamping mechanism comprises a clamping rod, wherein the clamping rod extends longitudinally along the axis of the stator assembly. In some examples, the clamping rod extends coaxially within the clamping element.

In some examples, the (e.g. each) clamping mechanism comprises at least one (e.g. a pair of) compression element(s). In some examples, each of the pair of compression elements is arranged to surround opposite ends of the respective clamping rod.

In some examples, the (e.g. each) compression element has a frustoconical shape. In other examples, the (e.g. each) compression element is angled with respect to the axis of the stator assembly.

US 12,683,440 B2

5

In some examples, the compression elements are arranged to transmit an axially inward force exerted on a face of the stator assembly to the respective clamping rod and hence the respective clamping element.

In an example, the curved face of the (e.g. each) compression element transmits the axially inward force as a radially and azimuthally outward force on the respective clamping element. Thus, in an example, the at least one compression element is arranged to convert an axially inward force exerted on the at least one compression element into the radially inward force on the respective adjacent pair of stator teeth.

In an example, the clamping element exerts a force azimuthally on the inner faces of the lower body portions of the respective adjacent pair of stator teeth, and a force radially inwards on the lower flanges of the respective adjacent pair of stator teeth. The clamping mechanism may allow for improved aligning and maintaining of the position of the teeth.

In some examples, the axial extent of the (e.g. each) clamping mechanism is greater than the axial extent of the stator teeth.

In some examples, the stator assembly comprises a plurality of nuts, wherein the (e.g. each) nut is arranged to engage with a respective clamping mechanism to increase the axially inward force when the nut is tightened. Thus, the method may comprise tightening a nut at the end of each clamping mechanism so to convert an axially inward force on the clamping mechanism into the radially inward force. Each nut may be arranged at the end of the respective clamping mechanism, and in an example the nut may be arranged externally to the stator teeth.

In some examples, each nut is arranged externally to the heat sink, such that each clamping mechanism and hence respective pair of adjacent stator teeth are clamped to the heat sink.

In some examples, the heat sink has a plurality of grooves complementary to the shape of the proximal end of the stator tooth, such that the heat sink is arranged to engage with the plurality of stator teeth.

In an example, the (e.g. each) pair of adjacent stator teeth is arranged to be moved radially inwards when the respective nut is tightened. Therefore, tightening the plurality of nuts may move the stator teeth closer together. This may make the construction of the stator assembly more secure, as there may be more friction between adjacent stator teeth.

In some examples, the stator assembly comprises a plurality of plates, wherein the plurality of plates are arranged at an end face of the stator assembly. In some examples, the (e.g. each) plate is arranged to connect respective adjacent pairs of clamping mechanisms.

In some examples, the (e.g. each) plate is arranged between the respective clamping mechanism and its respective nut. This may prevent relative axial movement of the stator teeth in and out of the stator assembly, and may make the stator assembly more secure.

The ends of the (e.g. each) plate may be bent such that they engage with the edges of the respective nuts, which may help to prevent unscrewing of the nuts and may further secure the stator assembly.

This clamping mechanism may be advantageous in its own right and therefore, according to this disclosure, there is also provided a clamping mechanism for a stator assembly comprising a plurality of stator teeth; wherein the clamping mechanism is arranged between an adjacent pair of stator teeth; wherein the clamping mechanism extends along the axial extent (e.g. in the direction parallel to the axis of the stator assembly) of the adjacent pair of stator teeth; and wherein the clamping mechanism is arranged to convert an axially inward force applied by the clamping mechanism (e.g. at the end face of the stator assembly, e.g. applied by a nut of the clamping mechanism) to a radially inward force on the adjacent pair of stator teeth.

The central flange of the (e.g. each) stator tooth comprises a first portion extending azimuthally in one direction from the body portion of the stator tooth, and a second portion extending azimuthally in a direction opposite to that of the first portion. The central flange may be any shape which allows for the central flange of a stator tooth to engage with the central flange of an adjacent stator tooth, to facilitate flux transfer between the stator teeth.

In some examples, the shape of the first portion of the central flange of the stator tooth is complementary to the shape of the second portion of the central flange of an adjacent stator tooth. Thus, in some examples, the shape of the central flange on one side of the body portion is complementary to the shape of the central flange on the opposite side of the body portion of an adjacent stator tooth.

In some examples, a first manufacturing tolerance of a first face of the central flange perpendicular to the body portion is less than the manufacturing tolerance of a second face of the central flange parallel to the body portion.

If the manufacturing tolerance of the second face is greater than first face, the surface of the second face may not need to be machined after the stator tooth is stamped. This may reduce the manufacturing costs of the individual stator teeth by reducing the overall amount of machining required.

In some examples, the shape of the central flange comprises a plurality of steps when viewed from a radial cross-section of the stator assembly. This shape is favourable as it may increase the surface area of contact between radial facing surfaces of adjacent stator teeth, which may facilitate the transfer of electromagnetic flux and heat radially throughout the stator assembly and therefore help to improve the efficiency and performance of the stator assembly.

In some examples, a first manufacturing tolerance of a first face of the plurality of steps perpendicular to the body portion is less than a second manufacturing tolerance of a second face of the plurality of steps parallel to the body portion.

Due to the differences in manufacturing tolerances of the faces of the central flange, when the stator teeth are assembled, there may be a small gap(s) extending long the axis of the stator assembly in the radial plane between adjacent (e.g. pairs of) stator teeth. The small gap may allow for azimuthal movement of the stator teeth even once the stator is assembled, such that the during assembly the azimuthal positioning of the stator teeth may be less precise than if there were no small gap. This may help improve the speed and case of assembling the stator teeth.

The small gap may also allow for small variations in the size of each stator tooth. Small variations are likely to occur during the stamping process which, without allowing for a small gap between the teeth, may prevent the central flanges of adjacent stator teeth from engaging with each other.

In some examples, the azimuthal extent (e.g. width) of the (e.g. each) central flange is substantially less than the radial extent (e.g. length) of the body portion.

The arrangement of the central flange may be advantageous in its own right and therefore, according to this disclosure, there is also provided a stator tooth for a stator assembly, wherein the stator tooth comprises: a (e.g. radially) extended body portion; and an (e.g. azimuthally)

extended central flange arranged along the length of the body portion (e.g. projecting substantially perpendicularly from the body portion); wherein the central flange comprises a plurality of steps; and wherein a first manufacturing tolerance of a first face of the plurality of steps perpendicular to the body portion is less than a second manufacturing tolerance of a second face of the plurality of steps parallel to the body portion.

In some examples, the central flange is arranged to engage with the central flange of another (e.g. adjacent) stator tooth.

In some examples, the body portion of each stator tooth is tapered at substantially the same angle, e.g. the body portion is narrower at the proximal end than it is at the distal end, or the body portion is narrower at the distal end than the proximal end. In some examples, the upper body portion of each stator tooth may be tapered, (e.g. the upper body portion is narrower at its distal end than at the end proximal to the central flange), and the lower body portion of each stator tooth is not tapered.

When assembled, the plurality of stator teeth are spaced azimuthally from each other, with a gap between each adjacent pair of stator teeth. In some examples, when assembled the gap between adjacent stator teeth is substantially uniform such that the windings mounted on adjacent pairs of stator teeth may be parallel. A uniform gap between adjacent pairs of stator teeth may allow for more uniform air flow which may improve cooling of the stator assembly.

In some examples, when assembled the gap between the lower body portions of adjacent stator teeth may be parallel, such that the positioning of the clamping mechanisms may be eased.

In some examples, the upper body portion of each stator tooth is tapered substantially at the same angle. In some examples, the lower body portion of each stator tooth is tapered substantially at the same angle. This may help the gaps between adjacent stator teeth to be uniform. In the case of the lower body portion of each stator tooth, this may allow for an increased radially inward force to be exerted on the stator teeth by the clamping mechanisms.

In another example, cooling pipes are inserted between the upper body portions of adjacent pairs of stator teeth. The placement of the cooling pipes may be assisted by the uniform air gaps.

The tapered body portion of each stator tooth may also push the windings radially inwards, which may increase the tension in the windings and help to hold them in place and make the stator assembly more resistant to mechanical vibrations.

Additionally, movement of the windings radially inwards exposes the distal end of the stator tooth, which may increase the surface of the stator tooth which is exposed to the air. This may improve the cooling of the stator teeth, especially given the distal ends of the stator teeth are likely to be warmer as this is where the transfer of electromagnetic flux from the stator to the rotor and vice versa may take place.

BRIEF DESCRIPTION OF THE DRAWINGS

One or more non-limiting examples will now be described, by way of example only, and with reference to the accompanying figures in which:

FIG. 2c shows a perspective view of the stator tooth shown in FIG. 2a;

FIG. 3a shows an end-on view of a plurality of stator teeth of the type shown in FIG. 2a;

FIG. 6 shows an enlarged section of the stator shown in FIG. 5a;

FIG. 7 shows a perspective view of the clamping components shown in FIG. 6;

DETAILED DESCRIPTION OF THE INVENTION

The examples described herein may be used for the assembly of a stator from individual stator teeth for use with an outer rotor in an electric motor. Other applications where an inner or outer rotor is used are, however, also envisaged and the examples are not limited to this.

Figure 1:
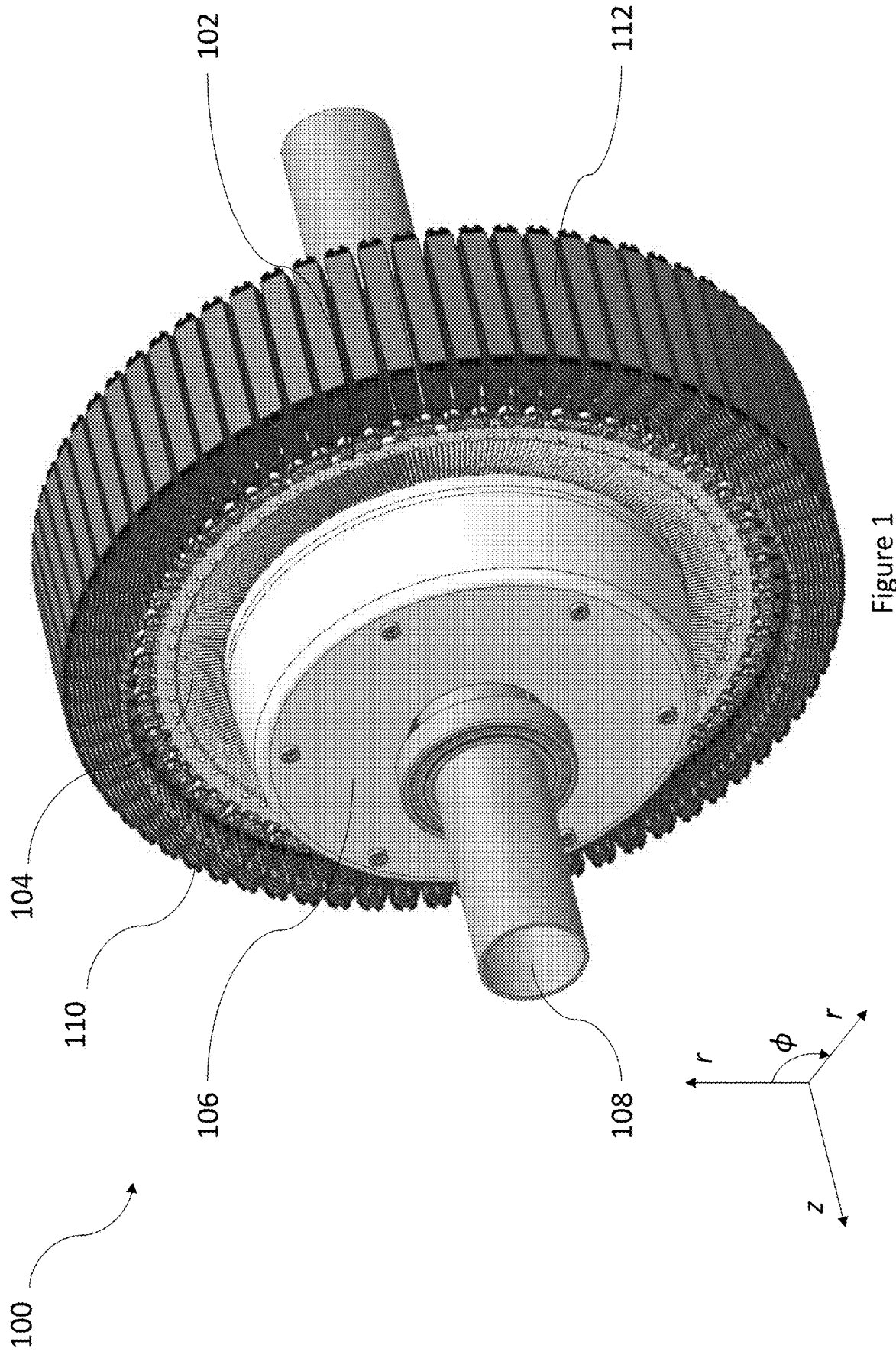
FIG. 1 shows a perspective view of a stator for an electrical machine.

FIG. 1 shows a perspective view of a stator 100 designed to be operated with an outer rotor (not shown).

The stator 100 includes a stator core 102. The stator core 102 extends in the axial direction z. The stator core 102 comprises stator teeth 112 arranged to project radially outwards from the outer circumference of the stator core 102 in the radial direction r. The teeth are spaced azimuthally from each other in the azimuthal direction.

The stator core extends circumferentially around a heat sink 104, and is arranged to be used with an outer rotor (not shown) arranged around its outer circumference. The stator core 102 is azimuthally and axially symmetric.

The heat sink 104 further includes an electronics housing 106 mounted onto each of its end faces. The electronics housing 106 includes all electronics required to operate the motor (not shown), and protects the electronics from moisture, foreign object damage and corrosion. An axle 108 passes through the centre of each of the electronics housing 106, heat sink 104 and stator core 102, such that they are all coaxially mounted and wires are able to be passed through the interior of the stator core 102 via the axle 108.

The stator teeth 112 are surrounded by bundles of stator windings 110, which are wound around the stator teeth 112 and fill the gaps formed by the stator teeth (not shown).

Figure 2B:
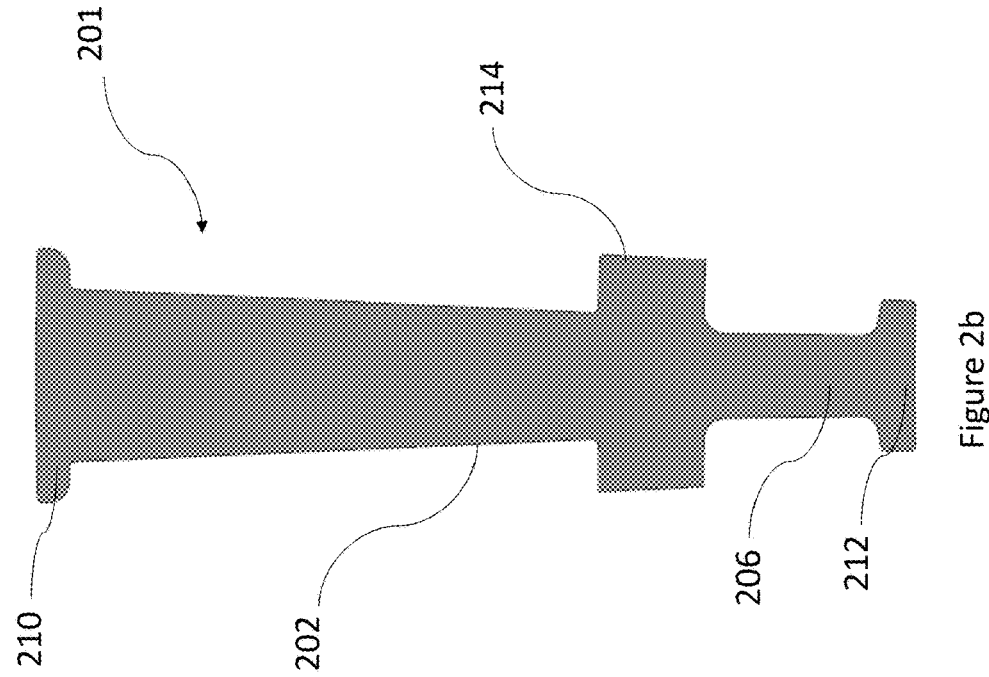
FIG. 2b shows an end-on view of a second stator tooth.
Figure 2A:
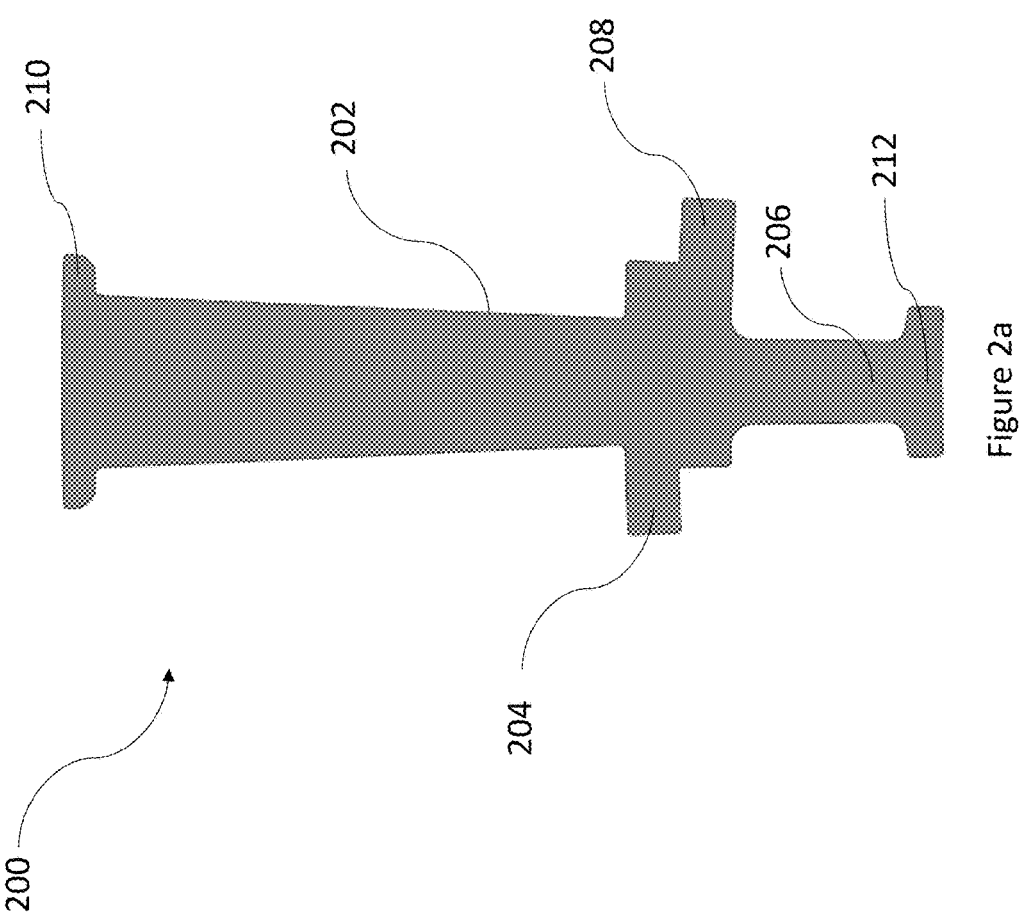
FIG. 2a shows an end-on view of a first stator tooth.

FIG. 2a shows an end-on view of an individual first stator tooth 200. The first stator tooth 200 comprises a radially extending first body portion 202, with a distal end flange 210 (distal to the centre of the stator) extending substantially azimuthally.

At a proximal end of the first body portion 202 is a first central flange extending azimuthally. The first central flange comprises a first arm portion 204 comprising a flange extending azimuthally away from the first body portion 202. The first arm portion 204 is substantially 'L' shaped when viewed from an end face of the stator tooth.

The first central flange further comprises a second arm portion 208 comprising a flange extending azimuthally away from the first body portion 202 in the opposite direction to the first arm portion 204. The second arm portion 208 is substantially reverse 'L' shaped when viewed from an end face of the stator tooth, such that the shape of the first and second arm portions 204, 208 are complementary.

A second body portion 206 extends radially from the second arm portion 208, such that it is aligned with the radial extent of the first body portion 202. The width of the second body portion 206 is less than that of the first body portion 202. The length of the second body portion 206 is also substantially less than that of the first body portion 202.

At the end of the second body portion 206 distal from the second arm portion 208 (but proximal to the centre of the stator) is a proximal end flange 212 extending azimuthally from either side of the second body portion 206.

Figure 3A:
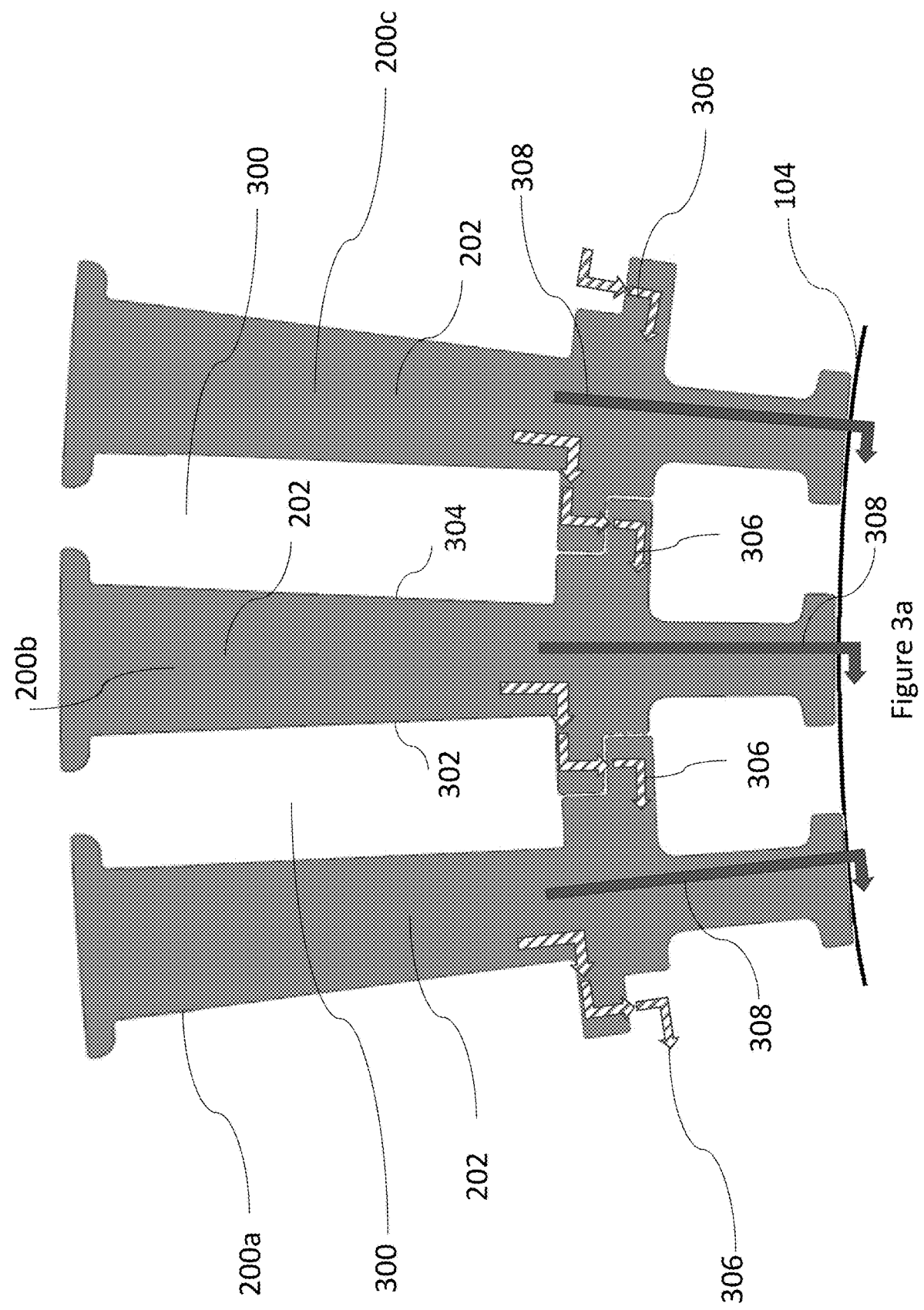

The respective shapes of the first and second arm portions 204, 208 are arranged such that when a plurality of first stator teeth 200 are arranged side-by-side, the first arm portions 204 are able to engage with the second arm portions 208 of the adjacent stator tooth 200, as shown in FIG. 3*a*. This forms a circle of stator teeth 200 and enables continuous stator core to be formed.

The first body portion 202 is tapered, being wider at the end towards the distal end flange 210, and narrower at the end towards the first arm portion 204. The second body portion 206 is also tapered, being narrower at the end towards the proximal end flange 212.

FIG. 2*b* shows an alternative second stator tooth 201 with upper body portion 202, lower body portion 206, proximal end flange 212 and distal end flange 210. The second stator tooth 201 comprises a second central flange 214 extending azimuthally away from both sides of the first body portion 202. The second central flange 214 is the same shape on both sides of the second stator tooth 201.

Figure 2C:
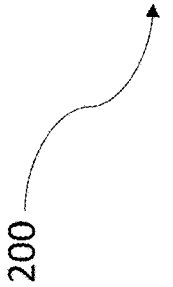

FIG. 2*c* shows a perspective view of the first stator tooth 200 shown in FIG. 2*a*. The first stator tooth 200 extends axially along the desired axial length of the stator core. The first stator tooth 200 may be formed from multiple laminations of the same cross-sectional shape (e.g. that shown in FIG. 2*a*), which are then joined together to form the axially elongated tooth 200 shown in FIG. 2*c*.

The second stator tooth 201 also extends axially along the desired axial length of the stator core (not shown), and may be formed from multiple laminations joined together in the same way as for the first stator tooth 200.

FIG. 3*a* shows a plurality of first stator teeth 200*a*, 200*b*, 200*c* (i.e. as shown in FIGS. 2*a* and 2*c*) arranged side-by-side such that they are adjacent to each other surrounding the outer circumference of the heat sink 104.

The tapered first body portion 202 is such that when the plurality of first stator teeth 200*a*, 200*b*, 200*c* are arranged side-by-side in a circle (i.e. around the outer circumference of the heat sink 104), there is a substantially uniform gap 300 between the first body portion 202 of the stator teeth 200*a* and 200*b*, and 200*b* and 200*c* respectively. Furthermore, the axially extending surfaces 302, 304 of the first stator teeth 200*a*, 200*b*, 200*c* are substantially parallel.

The first stator teeth 200*a*, 200*b*, 200*c* are arranged such that the first arm portions 204 of each first stator tooth 200*b*, 200*c* engage with the respective second arm portions 208 of the adjacent first stator tooth 200*a*, 200*b*. This enables electromagnetic flux and heat to be transferred between the teeth via a first route 306.

Additionally, as the first stator teeth 200 are mounted on the heat sink 104, heat and electromagnetic flux are also transferred from each first stator tooth 200 to the heat sink 104 via a second route 308.

Figure 3B:
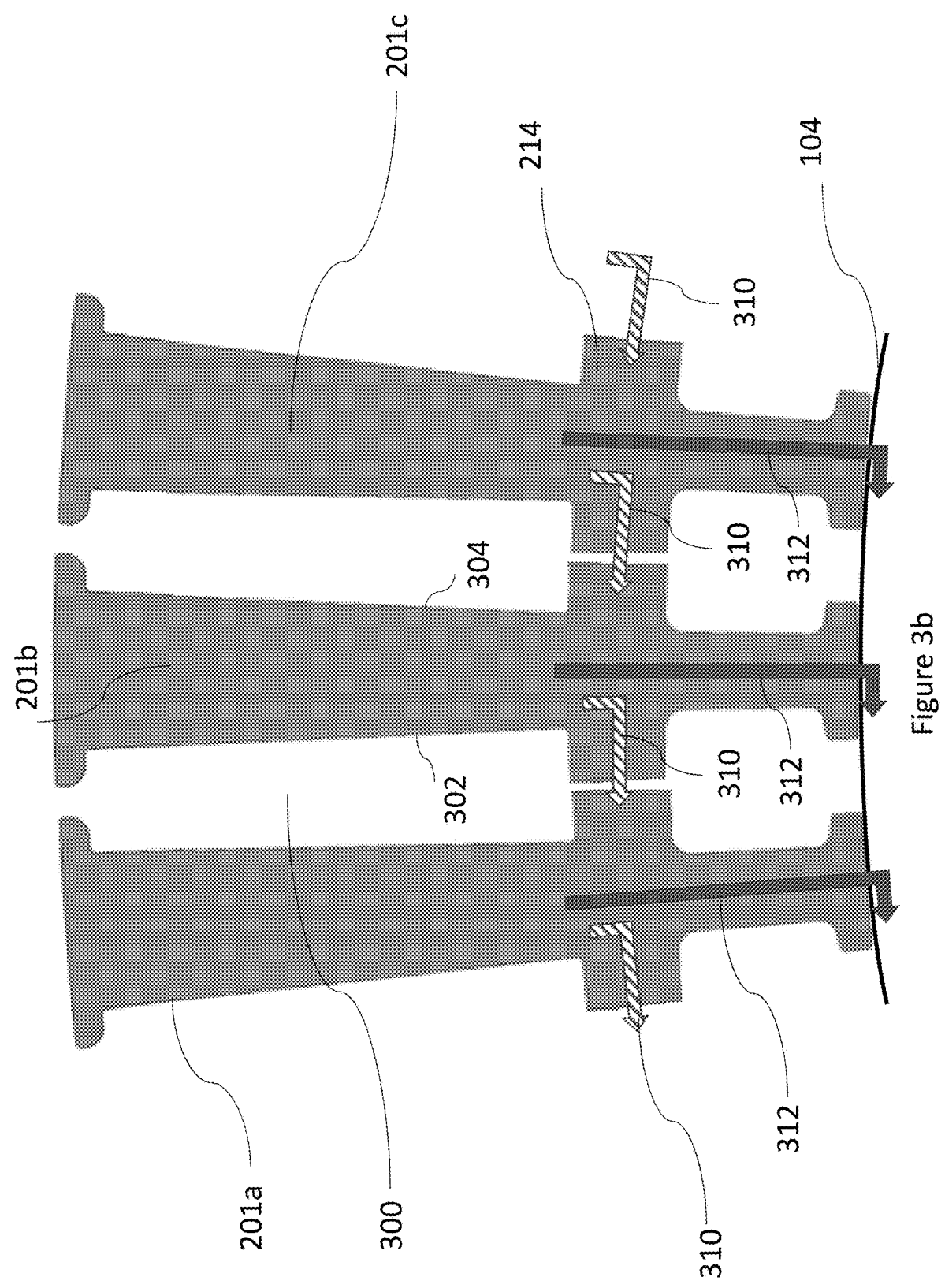
FIG. 3b shows an end-on view of a plurality of stator teeth of the type shown in FIG. 2b.

FIG. 3*b* shows a plurality of second stator teeth 201*a*, 201*b*, 201*c* (i.e. as shown in FIG. 2*b*) arranged side-by-side such that they are adjacent to each other surrounding the outer circumference of the heat sink 104. The second stator teeth 201*a*, 201*b*, 201*c* are arranged such that the second central flange 214 of each second stator tooth 201*a*, 201*b*, 201*c* engages with the respective second central flange 214 of the adjacent second stator tooth 201*a*, 201*b*, 201*c*. This enables electromagnetic flux and heat to be transferred between the teeth via a third route 310. Again, as the second stator teeth 201 are mounted on the heat sink 104, heat and electromagnetic flux are also transferred from each second stator tooth 201 to the heat sink 104 via a fourth route 312.

Figure 4:
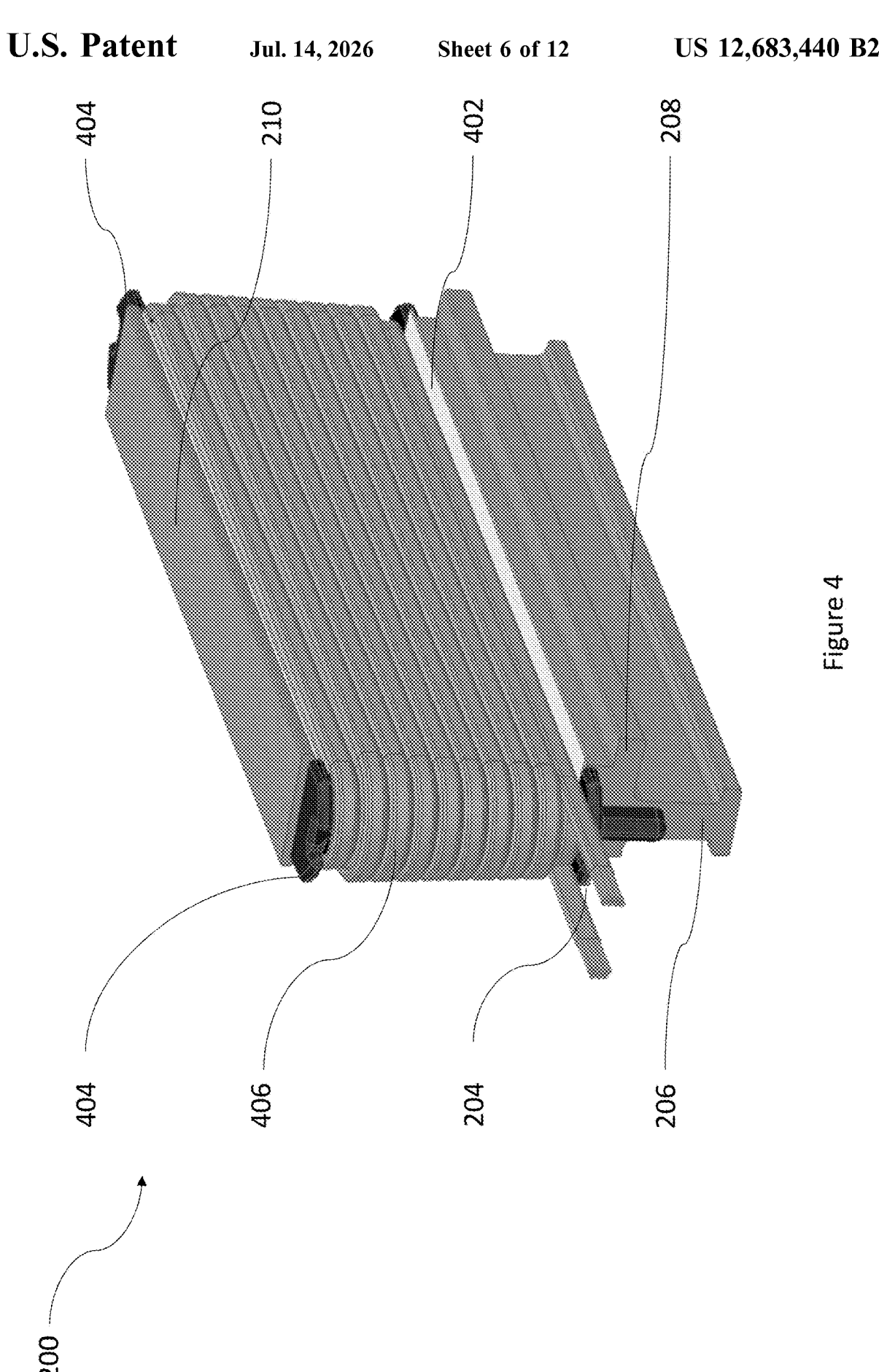
FIG. 4 shows a perspective view of the stator tooth shown in FIG. 2c with windings included.

FIG. 4 shows a perspective view of the first stator tooth 200 of FIGS. 2*a* and 2*c*, with stator windings 406 wrapped around the first body portion 202 of the first stator tooth 200. The azimuthal extent of the distal end flange 210 and the first arm portion 204 help to hold the stator windings in position.

At each axial end of the first stator tooth 200, a winding guide 404 is positioned on each end face of the first body portion 202. This helps the stator windings 406 to be wound uniformly around the first stator tooth 200. The winding guide 404 also helps to electrically insulate the windings 406 from the first stator tooth 200. The sides of the tooth are also surrounded by a slot liner 402, to electrically insulate the windings 406 from the stator tooth 200. The second stator tooth 201 (shown in FIG. 2*b*) may also have stator windings and winding guides arranged in the same way (not shown).

Figure 5A:
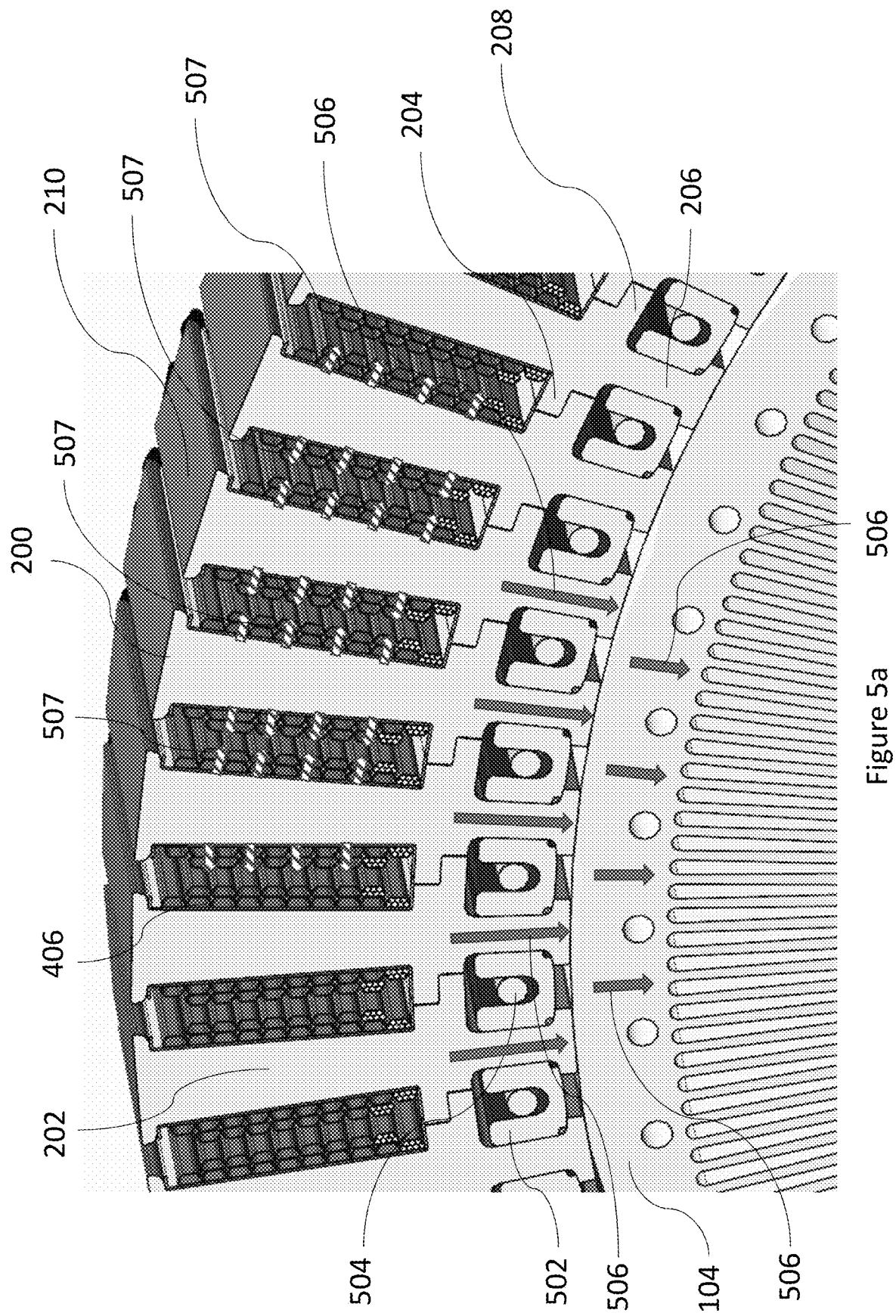
FIG. 5a shows a perspective view of a radial cross-section of an enlarged section of the stator shown in FIG. 4.

FIG. 5*a* shows an enlarged cross-sectional view of the assembled stator core, formed from a plurality of first stator teeth 200 slotted together, and includes the stator windings 406 between the plurality of first body portions 202. The stator teeth 200 are arranged around the heat sink 104 such that heat is able to transfer from the stator tooth to the heat sink via the first cooling paths 506. There is a uniform gap between the windings of adjacent pairs of first stator teeth 200, such that heat is transferred from the stator windings directly to the air via second cooling paths 507.

Positioned between pairs of adjacent second body portions 206 is a clamping element 502. The clamping element 502 is part of a clamping mechanism that helps to prevent azimuthal movement of each stator tooth 200, and extends along the axial length of each stator tooth 200. This is supported by the clamping rod 504, which extends substantially along the length of the axial length of each stator tooth 200. The distal end of the clamping rod 504 extends azimuthally (not shown in FIG. 5), which helps to prevent the axial movement of the clamping rod 504 and hence the clamping element 502.

As the second body portion 206 of each first stator tooth 200 is tapered, the surfaces between adjacent stator teeth are substantially parallel and hence the gaps between pairs of adjacent second body portions 206 are substantially equal, which helps to case the positioning of the clamping elements 502 between the pairs of first stator teeth 200. This arrangement is also possible using a plurality of second stator teeth 201 of FIG. 2*b* (not shown). Alternatively, each stator tooth may not be tapered, such that the surfaces between adjacent stator teeth are angled with respect to each other.

Figure 5B:
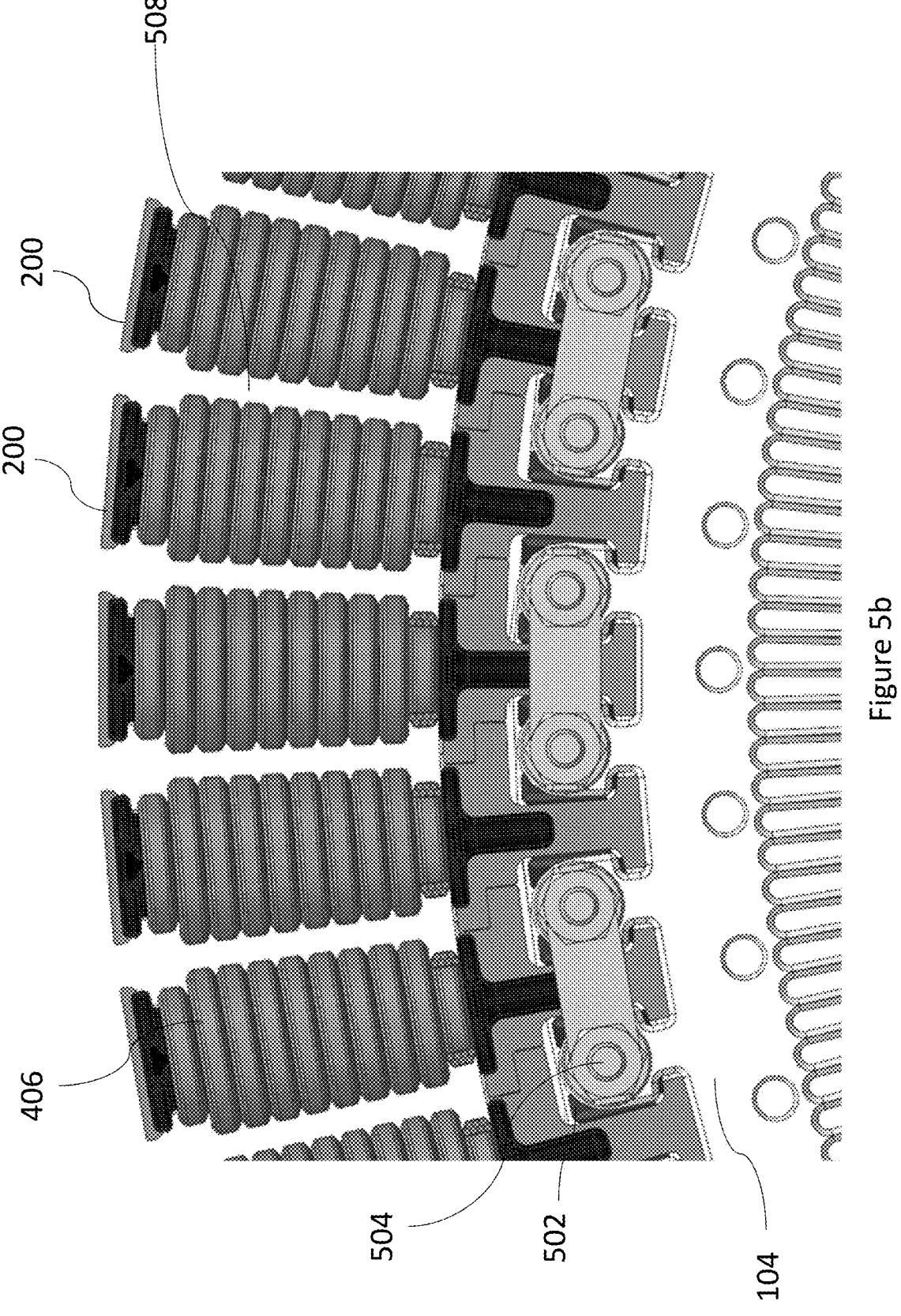
FIG. 5b shows an end-on view of an enlarged section of the stator shown in FIG. 4.

FIG. 5*b* shows an end-on view of the assembled stator core shown in FIG. 5*a*, which shows the uniform air gaps 508 between the adjacent pairs of first stator teeth 200 and their associated windings 406. FIG. 5*b* also shows the clamping elements 502 and the clamping rods 504, relative to the heat sink 104.

Figure 6:
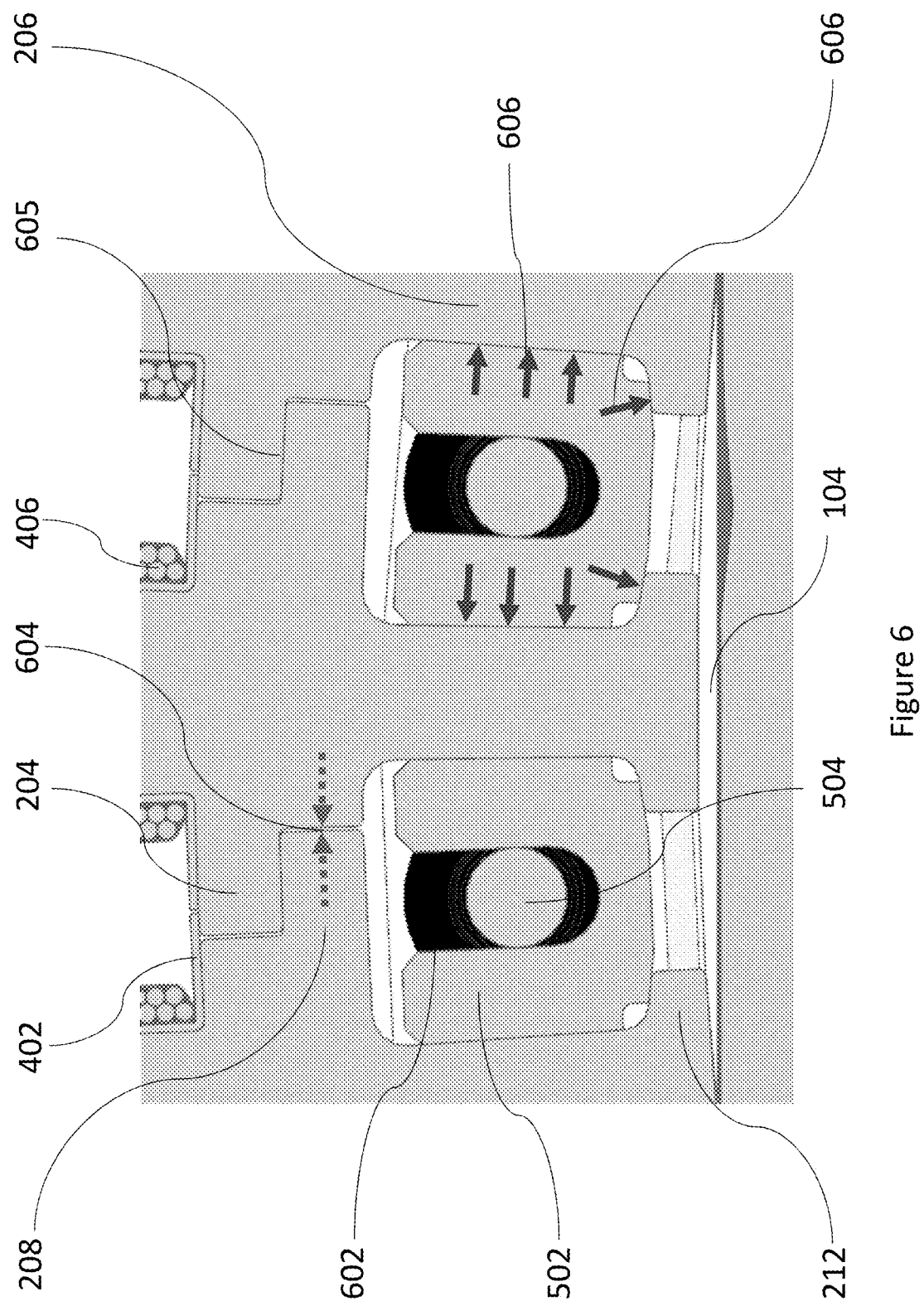

FIG. 6 shows an enlarged radial cross-section of the assembled stator core shown in FIG. 5*b*. The clamping element 502 exerts forces 606 on the respective stator tooth 200. The clamping element 502 exerts a radially inward force onto the upper surface of the respective proximal end flanges 212, which holds the stator teeth 200 together. The clamping element 502 also exerts an azimuthal force onto the sides of the respective second body portions 206 of the adjacent stator teeth 200, further helping to maintain the relative positions of the clamping elements 502 and stator teeth 200.

The azimuthal surfaces of the first and second arm portions 204, 208 are substantially in contact with each other when the stator teeth 200 are arranged adjacent to each other.

The azimuthal surfaces of contact between the arm portions 204, 208 provide a path for heat transfer and electromagnetic flux transfer between neighbouring teeth.

Furthermore, whilst the first and second arm portions 204, 208 are arranged to engage, there is a small gap 604 between the radial surfaces of the first and second arm portions 204, 208 (i.e. in the azimuthal direction). There is substantially no gap between the azimuthal surfaces of the first and second arm portions 204, 208 (i.e. in the radial direction) such that there is engagement 605 between adjacent pairs of stator teeth 200.

This small gap 604 allows for larger manufacturing tolerances of the stator assembly. The small gap 604 allows for any small variations in the dimensions of each stator tooth 200 and clamping element 502 whilst still enabling the first and second arm portions 204, 208 to engage. This may help to reduce manufacturing costs. Furthermore, this helps to prevent damage to the stator teeth from excessive rubbing during assembly of the stator core as the small gap 604 absorbs the circular stackup of the adjacent stator teeth 200 and clamping elements 502. The small gap 604 enables a continuous stator core to be formed from the plurality of stator teeth 200 even at the extremes of the manufacturing tolerances.

By allowing for the small gap 604 between stator teeth 200, only the azimuthal surfaces of the first and second arm portions 204, 208 may need to be machined after the stator tooth 200 has been stamped. This machining helps to ensure alignment, and face-to-face contact between the stator teeth, and reduces surface roughness. As the radial surfaces of the first and second arm portions 204, 208 may not need to be machined, the manufacturing cost of the stator assembly may be reduced.

Figure 7:
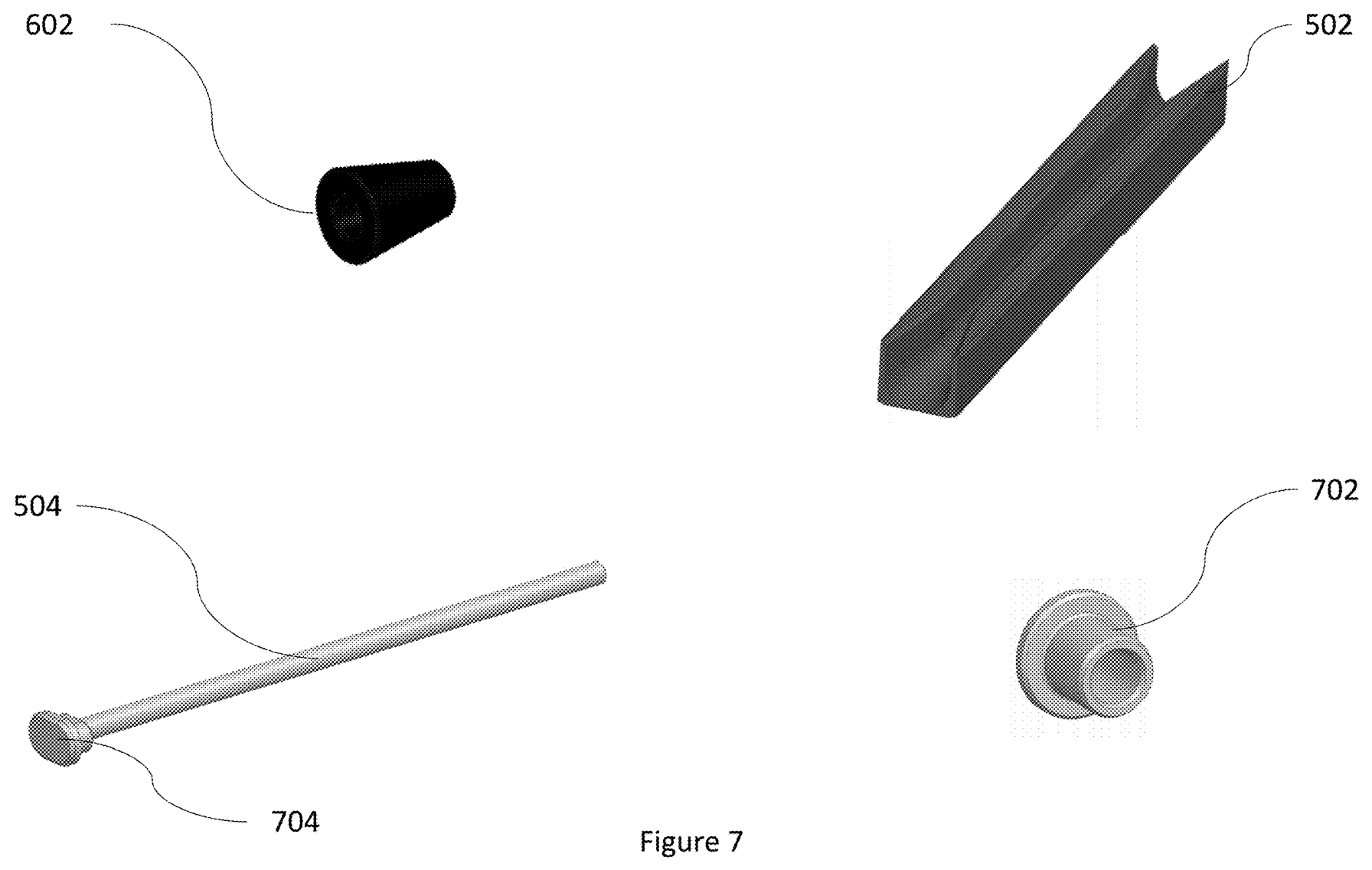

The components used in each clamping mechanism are shown in FIG. 7. This includes the clamping element 502, the clamping rod 504, clamping cones 602 and a compression element 702. The clamping rod 504 further comprises an end piece 704 extending perpendicular to the axial extent of the clamping rod 504.

Figure 8:
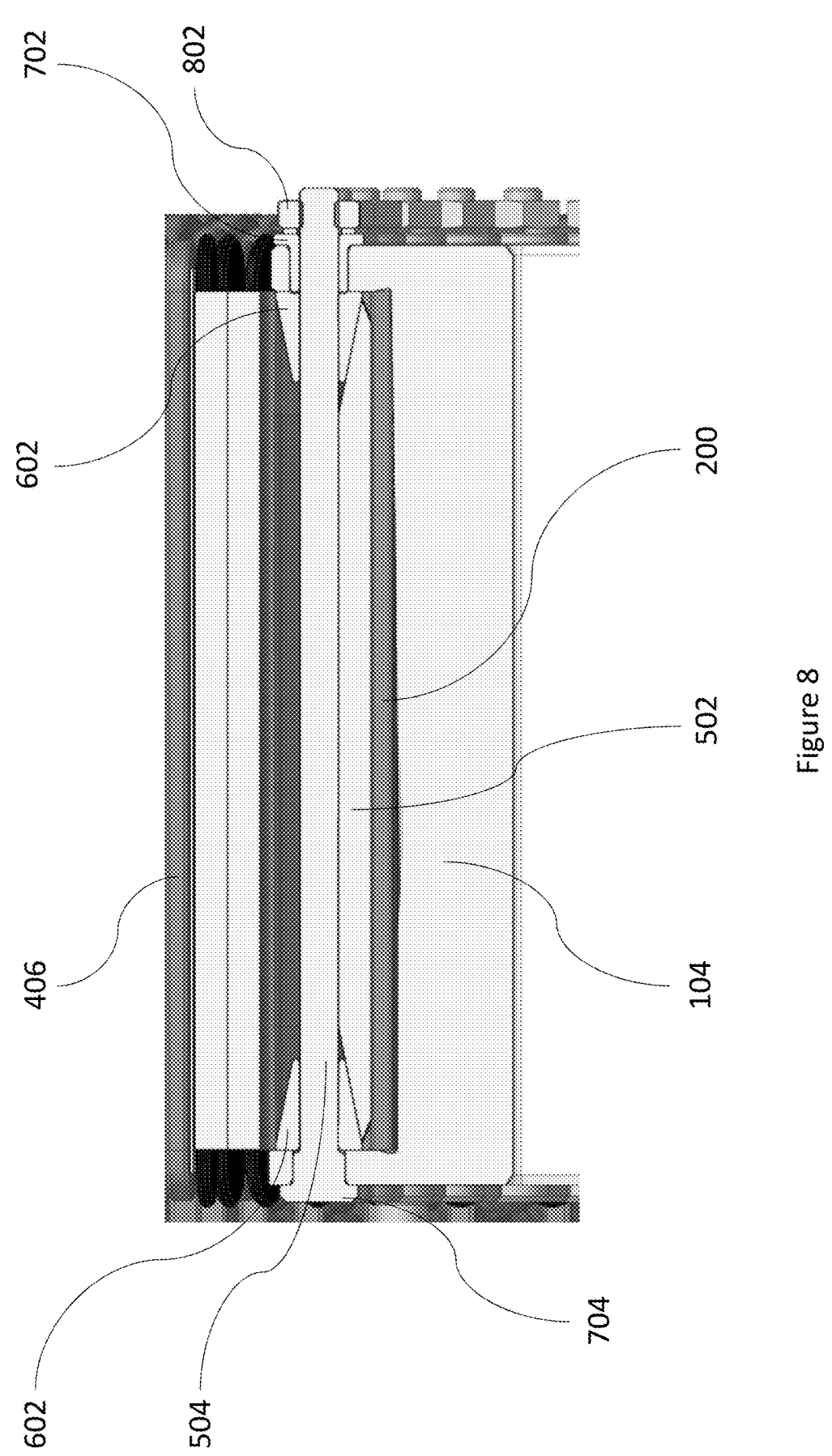
FIG. 8 shows an axial cross-section of the stator shown in FIG. 6.

FIG. 8 shows an axial cross-section of the stator core, and shows the clamping mechanism in more detail. The clamping element 502 is inserted between the stator teeth 200, and extends along the axial length of the stator tooth. The clamping rod 504 is inserted from the end face of the stator core, and is substantially longer than the axial length of the clamping element 502.

The clamping rod 504 radially extends from an end face of the stator core, and may be secured in place by the compression element 702, and a nut 802 at an end face of the stator core. At the end of the clamping rod 504 distal from the nut 802, the clamping rod 504 radially extends from an end face of the stator core, and includes an end piece extending substantially azimuthally. This end piece engages with the end face of the stator core, and helps to keep the clamping rod in position during assembly of the clamping mechanism. The end piece 704 has a substantially oval cross-section, however other shapes are also envisaged.

The end piece 704 of the clamping rod 504 is shaped such that it is complementary to the end face of the heat sink (not shown), which allows each clamping mechanism to engage with the heat sink 104 to further secure the stator assembly. This also prevents azimuthal rotation of the clamping rod 504 when the respective nut 802 is tightened during assembly.

The clamping rod 504 is surrounded by the pair of hollow clamping cones 602, which are slid onto the clamping rod 504 during assembly. A clamping cone 602 is arranged at each end of the clamping rod 504 and sits between the clamping rod 504 and the clamping element 502. The inner surface of the clamping element 502 is shaped complementary to the outer face of the clamping cone 602 such that the clamping element 502 engages with the pair of clamping cones 602.

The clamping element 502 engages with the second body portions 206 and proximal end flanges 212 of the respective adjacent pair of stator teeth 200. The base of each clamping cone 602 is also in contact with the heat sink 104, such that there is a reaction force transmitted from the heat sink 104 through the clamping cone 602 to the clamping element 504 and hence the respective stator teeth 200.

A torque force is exerted on the nut 802 when it is tightened, and this is transmitted though the compression element 702 as an axial force acting on one end of the clamping cone 602 proximal to the compression element 702. At the other end of the stator core, axially directed reaction forces on the distal end of the clamping rod 504 act on one end of the clamping cone 602 distal from the compression element 702.

The compression and reaction forces are transferred through each of the clamping cones 602 as axial forces acting in opposite directions along the clamping element 502, helping to prevent axial movement of the clamping mechanism.

Furthermore, the compression and reaction forces are also transmitted radially from the compression cones 602 to the clamping element 502, resulting in the radial forces 606 acting on the stator teeth as shown in FIG. 6. This helps to bring together the stator teeth 200 and clamp them in place.

Figure 9:
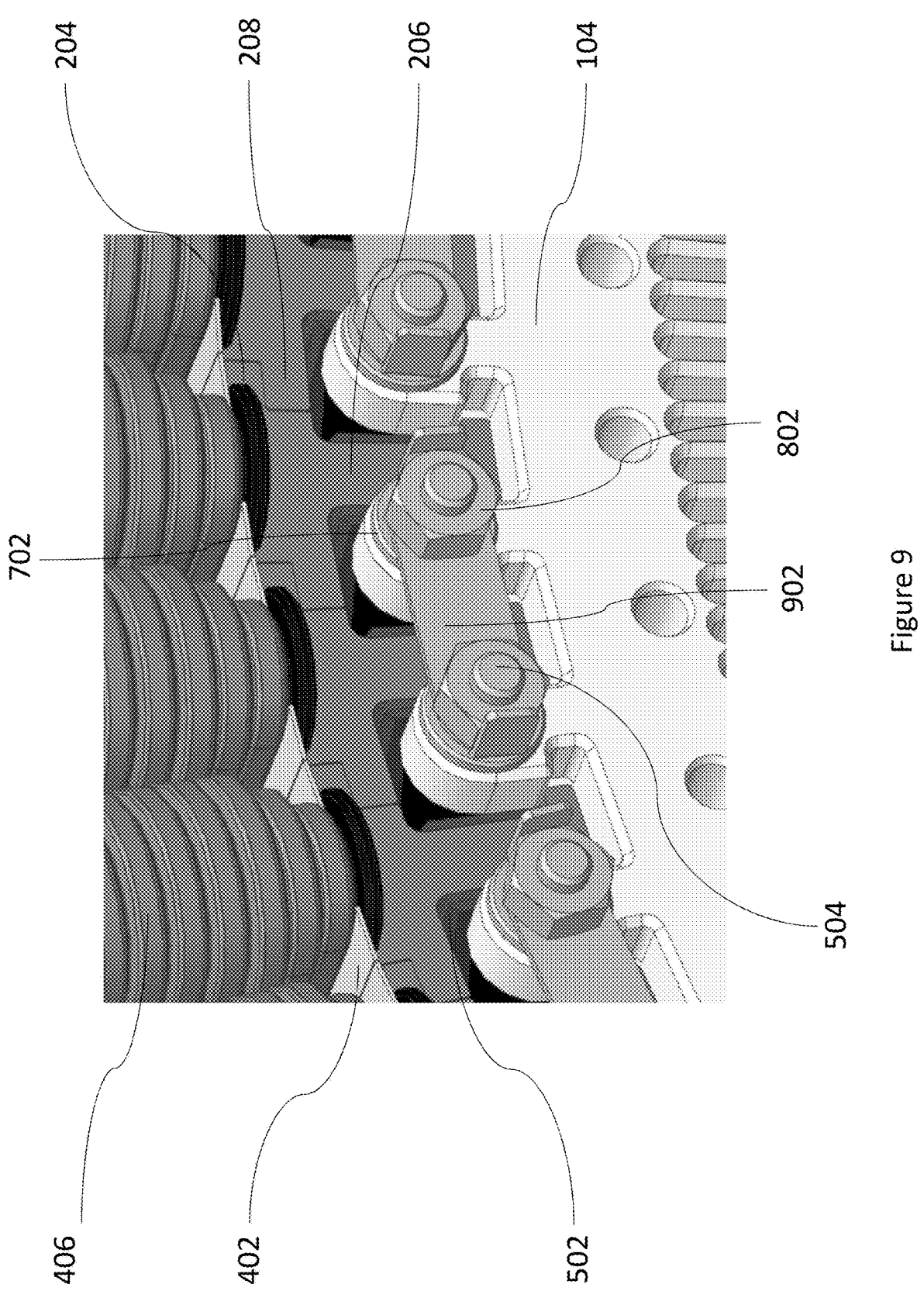
FIG. 9 shows a perspective view of an enlarged section of the stator shown in FIG. 5b.

FIG. 9 shows an enlarged perspective view of the assembled stator. The clamping mechanism 502 is arranged coaxial to the clamping rod 504, where the end of the clamping rod 504 engages with the front face of the heat sink 104 such that the clamping mechanism 502 is attached to the heat sink 104.

Additionally, pairs of adjacent clamping mechanisms 502 are connected by a plate 902 mounted over the heat sink 104 to the pairs of respective clamping rods 504, wherein the plate 902 is secured by the nut 802. Each nut 802 is attached to the respective clamping rod 504 by threaded engagement (not shown). Therefore, each clamping mechanism and respective pairs adjacent stator teeth are clamped to the heat sink 104, and tightening the nut 802 further secures the clamping mechanism and hence respective adjacent pair of stator teeth 200 to the heat sink 104. This further helps to prevent axial and azimuthal movement of each of the stator teeth 200, as well as securing the position of the heat sink 104 relative to the stator teeth.

In order to prevent loosening of a pair of the nuts 802 and hence misalignment of adjacent stator teeth 200, the ends of the plate 902 may be bent such that they are in contact with one of the hexagonal faces of each nut 802. This secures the nuts 802 in place by preventing their unwanted rotation.

What is claimed is:

1. A stator assembly for an electrical machine, wherein the stator assembly extends azimuthally around an axis, wherein the stator assembly comprises:
   a plurality of stator teeth extending radially;
      wherein the plurality of stator teeth are spaced azimuthally;
      wherein the plurality of stator teeth extend along a direction parallel to the axis of the stator assembly;
      wherein each stator tooth is individually formed and comprises a radially extended body portion;
      wherein the radially extended body portion comprises:
         an upper body portion;
         a lower body portion; and
         a central flange located along a length of the body portion between the upper body portion and the lower body portion;
         wherein the central flange is arranged to engage with the central flange of an adjacent stator tooth; and
   wherein the stator assembly further comprises:
      a plurality of clamping mechanisms;
         wherein each clamping mechanism is arranged between an adjacent pair of stator teeth;
         wherein each clamping mechanism extends axially between the lower body portions of the adjacent pair of stator teeth;
         wherein each clamping mechanism is arranged to engage with a radially innermost end of the body portions of the adjacent pair of stator teeth; and
         wherein each clamping mechanism is arranged to exert a radially inward force on the adjacent pair of stator teeth, such that the stator teeth are held together.

2. The stator assembly as claimed in claim 1, wherein the radially innermost end of each lower body portion comprises a lower flange arranged to engage with the respective clamping mechanism.

3. The stator assembly as claimed in claim 1, wherein each clamping mechanism comprises at least one compression element arranged to convert an axially inward force exerted on the at least one compression element into the radially inward force on the respective adjacent pair of stator teeth.

4. The stator assembly as claimed in claim 3, wherein each clamping mechanism comprises a clamping element arranged to extend longitudinally along the axis of the stator assembly.

5. The stator assembly as claimed in claim 4, wherein each clamping element is arranged to exert a force azimuthally on inside faces of the lower body portions of the respective adjacent pair of stator teeth, and a force radially inwards on lower flanges of the respective adjacent pair of stator teeth.

6. The stator assembly as claimed in claim 3, wherein each clamping mechanism comprises a clamping rod, wherein the clamping rod extends longitudinally along the axis of the stator assembly.

7. The stator assembly as claimed in claim 6, wherein each compression element is arranged to transmit an axially inward force exerted on a face of the stator assembly to the respective clamping rod and hence the respective clamping element.

8. The stator assembly as claimed in claim 3, wherein the stator assembly comprises a plurality of nuts, wherein each nut is arranged to engage with a respective clamping mechanism to increase the axially inward force when the nut is tightened.

9. The stator assembly as claimed in claim 8, wherein the stator assembly comprises a plurality of plates arranged at an end face of the stator assembly, wherein each plate is arranged to connect a respective adjacent pair of clamping mechanisms.

10. The stator assembly as claimed in claim 9, wherein each plate is arranged between the respective clamping mechanism and its respective nut.

11. The stator assembly as claimed in claim 1, wherein a shape of the central flange on one side of the body portion is complementary to a shape of the central flange on an opposite side of the body portion of an adjacent stator tooth.

12. The stator assembly as claimed in claim 11, wherein the central flange of each stator tooth is arranged to engage with the central flange of the adjacent stator tooth.

13. The stator assembly as claimed in claim 11, wherein a shape of the central flange comprises a plurality of steps when viewed from a radial cross-section of the stator assembly.

14. The stator assembly as claimed in claim 13, wherein a first manufacturing tolerance of a first face of the plurality of steps perpendicular to the body portion is less than a second manufacturing tolerance of a second face of the plurality of steps parallel to the body portion.

15. The stator assembly as claimed in claim 1, wherein an azimuthal extent of the central flange is substantially less than a radial extent of the body portion.

16. The stator assembly as claimed in claim 1, wherein the body portion of each stator tooth is tapered at substantially the same angle.

17. The stator assembly as claimed in claim 1, wherein the upper body portion of each stator tooth further comprises an upper flange projecting azimuthally from the stator tooth at an end distal from a center of the stator assembly.

18. A method of assembling a stator assembly for an electrical machine, wherein the stator assembly extends azimuthally around an axis, the method comprising:
   individually forming a plurality of separate stator teeth;
      wherein each stator tooth comprises:
         a radially extended body portion;
            wherein each radially extended body portion comprises:
               an upper body portion;
               a lower body portion; and
               a central flange located along a length of the body portion between the upper body portion and the lower body portion; and
   wherein the method further comprises:
      assembling the stator teeth such that they are spaced azimuthally, extend radially, and extend along a direction parallel to the axis of the stator assembly;
      engaging the central flange of each stator tooth with the central flange of an adjacent stator tooth;
      arranging a plurality of clamping mechanisms such that there is a clamping mechanism between each adjacent pair of stator teeth;
         wherein each clamping mechanism extends axially between the lower body portions of the respective adjacent pair of stator teeth; and
      engaging each clamping mechanism with a radially innermost end of the body portions of the respective adjacent pair of stator teeth;
         wherein each clamping mechanism exerts a radially inward force on the respective adjacent pair of stator teeth, holding the stator teeth together.

19. The method as claimed in claim 18, wherein the method comprises:

tightening a nut at an end of each clamping mechanism to convert an axially inward force on the clamping mechanism into the radially inward force.

20. A clamping mechanism for a stator assembly comprising:

a plurality of stator teeth;

wherein the clamping mechanism is arranged between an adjacent pair of stator teeth;

wherein the clamping mechanism extends along an axial extent of the adjacent pair of stator teeth; and wherein the clamping mechanism is arranged to convert an axially inward force applied by the clamping mechanism to a radially inward force on the adjacent pair of stator teeth.

* * * * *